(12) United States Patent　(10) Patent No.:　　US 6,370,865 B1
Sasaki et al.　　　　　　　　　(45) Date of Patent:　　　Apr. 16, 2002

(54) THERMAL POWER PLANT

(75) Inventors: Takashi Sasaki; Shoichi Hisa, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/417,011

(22) Filed: Oct. 12, 1999

(30) Foreign Application Priority Data

Oct. 12, 1998　(JP) ............................................ 10-289623

(51) Int. Cl.$^7$ ................................................ F02G 3/00
(52) U.S. Cl. ....................................................... 60/39.5
(58) Field of Search ............................. 60/39.5, 39.511, 60/39.02, 39.17

(56) References Cited

U.S. PATENT DOCUMENTS

| | | | | |
|---|---|---|---|---|
| 4,221,775 A | * | 9/1980 | Anno et al. .................. | 423/641 |
| 5,113,854 A | * | 5/1992 | Dosch .................... | 128/201.23 |
| 5,165,399 A | * | 11/1992 | Hochberg ................... | 128/205 |
| 5,634,426 A | * | 6/1997 | Tomlinson .................. | 116/207 |
| 5,724,805 A | | 3/1998 | Golomb et al. ............ | 60/39.02 |
| 5,832,712 A | * | 11/1998 | Ronning et al. ........... | 60/39.02 |

FOREIGN PATENT DOCUMENTS

GB　　2 140 873　　12/1984
WO　　94/01203　　1/1994

* cited by examiner

Primary Examiner—Charles G. Freay
Assistant Examiner—W Rodriguez
(74) Attorney, Agent, or Firm—Foley & Lardner

(57) ABSTRACT

A thermal power plant comprises: an air compressor which compresses a sucked air to generate a high pressure air; a gas turbine combustor adapted to supply a fuel to the high pressure air from the air compressor to generate a combustion gas; a high pressure gas turbine adapted to perform an expansion working of the combustion gas from the gas turbine combustor and generate an exhaust gas; a low pressure gas turbine and adapted to perform an expansion working of the exhaust gas from the high pressure gas turbine and generate an exhaust gas containing carbon dioxide; and a carbon dioxide absorbing and discharging equipment located on an outlet side of the low pressure gas turbine, the carbon dioxide absorbing and discharging equipment being provided with a carbon dioxide absorbing and discharging agent having a property of absorbing the carbon dioxide contained in the exhaust gas supplied from the low pressure gas turbine and decomposing the absorbed carbonate by the exhaust gas supplied from the high pressure gas turbine. A temperature of the gas turbine exhaust gas supplied from the high pressure gas turbine to the carbon dioxide absorbing and discharging equipment and a temperature of the exhaust gas supplied from the low pressure gas turbine thereto are set to predetermined range of values different from each other.

20 Claims, 5 Drawing Sheets

THERMAL POWER PLANT

BACKGROUND OF THE INVENTION

1. Technical Field of The Invention

The present invention relates to a thermal power plant, and in particular, to a thermal power plant which can effectively treat a carbon dioxide gas discharged from a gas turbine.

2. Prior Art

In a conventional thermal power plant, for example, in a gas turbine plant or in a combined cycle plant combining a steam turbine plant and an exhaust heat recovery boiler into the gas turbine plant, an air is added in a gas turbine combustor to a fuel so as to generate a combustion gas, and then, such plants are driven by a thermal energy of the generated combustion gas. Moreover, the air is compressed by an air compressor so as to generate a highly pressurized air (high pressure air), and then, is used as an oxidizing agent for generating a combustion gas.

In such a thermal power plant, a natural gas, an oil gas, a coal gas and the like are used as a fuel, and in general, these gases are composed of a carbon monoxide, carbon or other hydrogen carbide. Therefore, in the presence of air, the combustion gas after burning a fuel includes a carbon dioxide gas, nitrogen monoxide gas, sulfur oxide gas or the like, in addition to a nitrogen gas and an oxygen gas. In recent years, a harmful gas such as carbon dioxide gas, nitrogen oxide or sulfur oxide is discharged into the atmosphere, consisting a social problem in a global environmental level in view of a global warming (greenhouse) effect or environmental pollution.

By the way, according to a treatment process for a nitrogen oxide gas and sulfur oxide gas, these gases have been already restricted within a range of legal constraint value along with the development of technology. However, in a treatment process for a carbon dioxide gas, since an amount of the carbon dioxide gas to be treated is large, a preferable means for solving such problem has not been still found.

Recently, a solvent of selectively absorbing a carbon dioxide from the exhaust gas has been proposed as means for treating a carbon dioxide gas from a gas discharged into the atmosphere after the combustion. This solvent makes use of the property of readily discharging a carbon dioxide when heating the solvent absorbing the carbon dioxide.

There are the following several problems in the means for treating a carbon dioxide with the use of the above solvent already proposed.

First of all, although the carbon dioxide is absorbed by contacting it with the solvent, because the contact time is not infinitely taken, it is difficult to always contact an exhaust gas to the solvent during an operation of thermal power plant. For this reason, a carbon dioxide gas component is not recovered and remains in the exhaust gas. As a result, there is the possibility of discharging the carbon dioxide gas component into the atmosphere.

Secondary, in a thermal power plant, a large volume of carbon dioxide is generated. For this reason, a large volume of solvent is required in order to recover the large volume of carbon dioxide, and as a result, a great much of thermal energy for heating the solvent is required.

Therefore, according to the conventional method, a cost spent for a carbon dioxide recovery system itself becomes very high, and hence, a cost for driving the recovery system is also increased.

Furthermore, in the case of viewing from different angle, the following proposals have been made. More specifically, a solar energy is used so as to generate hydrogen to be used as a fuel. Moreover, a water vapor is added to carbon dioxide so as to generate a mixed gas, and then, the mixed gas is circulated while the water vapor being condensed to separate a carbon dioxide. However, these proposals are still in a state of laboratory level, and therefore, it is difficult to realize a practical use.

SUMMARY OF THE INVENTION

A primary object of the present invention is to substantially eliminate defects or drawbacks encountered in the prior art mentioned above and to provide a thermal power plant which can effectively treat a carbon dioxide with the use of a carbon dioxide absorbing and discharging agent which has a property of absorbing the carbon dioxide by using a lithium substance when reaching a predetermined temperature and decomposing the reacted lithium carbonate when reaching a predetermined temperature.

Another object of the present invention is to provide a thermal power plant which effectively makes use of a thermal energy discharged from a carbon dioxide absorbing and discharging agent so as to improve a plant thermal efficiency of the thermal power plant.

These and other objects can be achieved according to the present invention by providing, in one aspect, a thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

a low pressure gas turbine operatively connected to the high pressure gas turbine and adapted to perform an expansion working of the exhaust gas from the high pressure gas turbine and generate an exhaust gas containing carbon dioxide; and a carbon dioxide absorbing and discharging equipment located on an outlet side of the low pressure gas turbine, the carbon dioxide absorbing and discharging equipment being provided with a carbon dioxide absorbing and discharging agent having a property of absorbing the carbon dioxide contained in the exhaust gas supplied from the low pressure gas turbine and decomposing the absorbed carbonate by the exhaust gas supplied from the high pressure gas turbine, wherein a temperature of the gas turbine exhaust gas supplied from the high pressure gas turbine to the carbon dioxide absorbing and discharging equipment and a temperature of the exhaust gas supplied from the low pressure gas turbine to the carbon dioxide absorbing and discharging equipment are set to predetermined ranges of values different from each other.

In preferred embodiments, the thermal power plant may further comprise a regenerator operatively connected to the carbon dioxide absorbing and discharging equipment and the air compressor and adapted to generate a heat by utilizing a carbon dioxide gas discharged from the carbon dioxide absorbing and discharging equipment as a heat source and to heat the high pressure air supplied from the air compressor to the gas turbine combustor, or may comprise a fuel heater operatively connected to the carbon dioxide absorbing and discharging equipment and the gas turbine combustor and adapted to heat the fuel to be supplied to the gas turbine combustor by using the carbon dioxide gas discharged from the carbon dioxide absorbing and discharging equipment as a heat source.

The thermal power plant may further comprises an exhaust gas heat recovery boiler operatively connected to the low pressure gas turbine exhaust gas side of the carbon dioxide absorbing and discharging equipment and adapted to generate a steam and a steam turbine plant which is driven by the steam generated from the exhaust gas heat recovery boiler, and a fuel heater may be also provided additionally.

A fuel heater is operatively connected to the carbon dioxide absorbing and discharging equipment and the gas turbine combustor and adapted to heat the fuel to be supplied to the gas turbine combustor by using the carbon dioxide gas discharged from the carbon dioxide absorbing and discharging equipment as a heat source.

The carbon dioxide absorbing and discharging equipment is provided with a heat exchanger for heating the carbon dioxide absorbing and discharging agent by using the exhaust gas from the high pressure gas turbine.

The carbon dioxide absorbing and discharging equipment is provided with a seal portion for sealing and circulating the carbon dioxide absorbing and discharging agent therein. The carbon dioxide absorbing and discharging agent is composed of a lithium substance having the property of absorbing the carbon dioxide contained in the exhaust gas from the low pressure turbine and decomposing an absorbed lithium carbonate by the exhaust gas from the high pressure turbine. A temperature of the gas turbine exhaust gas supplied from the high pressure gas turbine to the carbon dioxide absorbing and discharging equipment is set to approximately 700° C., and a temperature of the exhaust gas supplied from the low pressure gas turbine to the carbon dioxide absorbing and discharging equipment is set to approximately 500° C.

In another aspect, there is provided a thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

an intermediate pressure gas turbine operatively connected to the high pressure gas turbine and adapted to perform an expansion working of the exhaust gas from the high pressure gas turbine and generate an exhaust gas;

a carbon dioxide absorbing and discharging equipment located on an outlet side of the intermediate pressure gas turbine, the carbon dioxide absorbing and discharging equipment being provided with a carbon dioxide absorbing and discharging agent composed of a lithium substance having a property of absorbing the carbon dioxide contained in the exhaust gas supplied from the intermediate pressure gas turbine and decomposing the absorbed lithium carbonate by the exhaust gas supplied from the high pressure gas turbine; and a low pressure gas turbine operatively connected to the carbon absorbing and discharging equipment and adapted to perform an expansion working of the exhaust gas from the intermediate pressure turbine.

In this aspect, substantially the same or similar preferred embodiments as or to those mentioned above in the first aspect may be applicable.

Further, the exhaust gas supplied from the intermediate pressure gas turbine to the carbon dioxide absorbing and discharging equipment is set so as to have a temperature of approximately 500° C. and a pressure of about 2 ata.

In a further aspect of the present invention, there is provided a thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

a low pressure gas turbine operatively connected to the high pressure gas turbine and adapted to perform an expansion working of the exhaust gas from the high pressure gas turbine and generate an exhaust gas containing carbon dioxide;

a plurality of carbon dioxide absorbing and discharging equipments located on an outlet side of the low pressure gas turbine, each of the carbon dioxide absorbing and discharging equipments being provided with a carbon dioxide absorbing and discharging agent having a property of absorbing the carbon dioxide contained in the exhaust gas supplied from the low pressure gas turbine and decomposing the absorbed carbonate by the exhaust gas supplied from the high pressure gas turbine; and a change-over system operatively connected to the carbon dioxide absorbing and discharging equipments and adapted to change over the carbon dioxide absorbing and discharging equipments.

In this aspect, substantially the same or similar preferred embodiments as or to those mentioned above in the first aspect may be applicable.

Further, the change-over system may comprise: a first high temperature turbine exhaust gas supply pipe including a valve for supplying the exhaust gas from the high pressure gas turbine to a first carbon dioxide absorbing and discharging equipment; a first supply pipe for the low pressure gas turbine, which supplies the high pressure gas turbine exhaust gas from the first carbon dioxide absorbing and discharging equipment to the low pressure gas turbine; a second low temperature turbine exhaust gas supply pipe including a valve for supplying the exhaust gas from the low pressure gas turbine to the second carbon dioxide absorbing and discharging equipment; a second high temperature turbine exhaust gas supply pipe including a valve for supplying the exhaust gas from the high pressure gas turbine to a second carbon dioxide absorbing and discharging equipment; a second supply pipe for the low pressure gas turbine, which supplies the high pressure gas turbine exhaust gas from the second carbon dioxide absorbing and discharging equipment to the low pressure gas turbine; and a first low temperature turbine exhaust gas supply pipe including a valve for supplying the exhaust gas from the low pressure gas turbine to the first carbon dioxide absorbing and discharging equipment.

According to the various aspects of the present invention mentioned above, the thermal power plant includes the carbon dioxide absorbing and discharging equipment which is filled up with the carbon dioxide absorbing and discharging agent for treating carbon dioxide. The carbon dioxide absorbing and discharging agent has a property of absorbing carbon dioxide contained in the gas turbine exhaust gas discharged from the gas turbine plant at a temperature of about 500° C. and decomposing the absorbed lithium carbonate at a temperature of about 700° C. The agent is composed of lithium substance as a main component in order to make low a concentration of the carbon dioxide. Thus, it is possible to contribute to a prevention for global warming effect and environmental pollution.

Further, the thermal power plant according to the present invention includes the other means, such as regenerator, which uses a turbine exhaust gas having a low concentration of carbon dioxide from the carbon dioxide absorbing and discharging equipment and heats the high pressure air supplied from the air compressor to the gas turbine combustor or the fuel introduced into the gas turbine combustor. Thus, it is possible to effectively use a thermal energy and to improve a plan heat efficiency.

The nature and further characteristic features of the present invention will be made clear from the following descriptions made with reference to the accompanying drawings.

DESCRIPTION OF THE PREFERRED EMBODIMENTS

Embodiments of a thermal power plant according to the present invention will be described hereunder with reference to the accompanying drawings.

Figure 1:
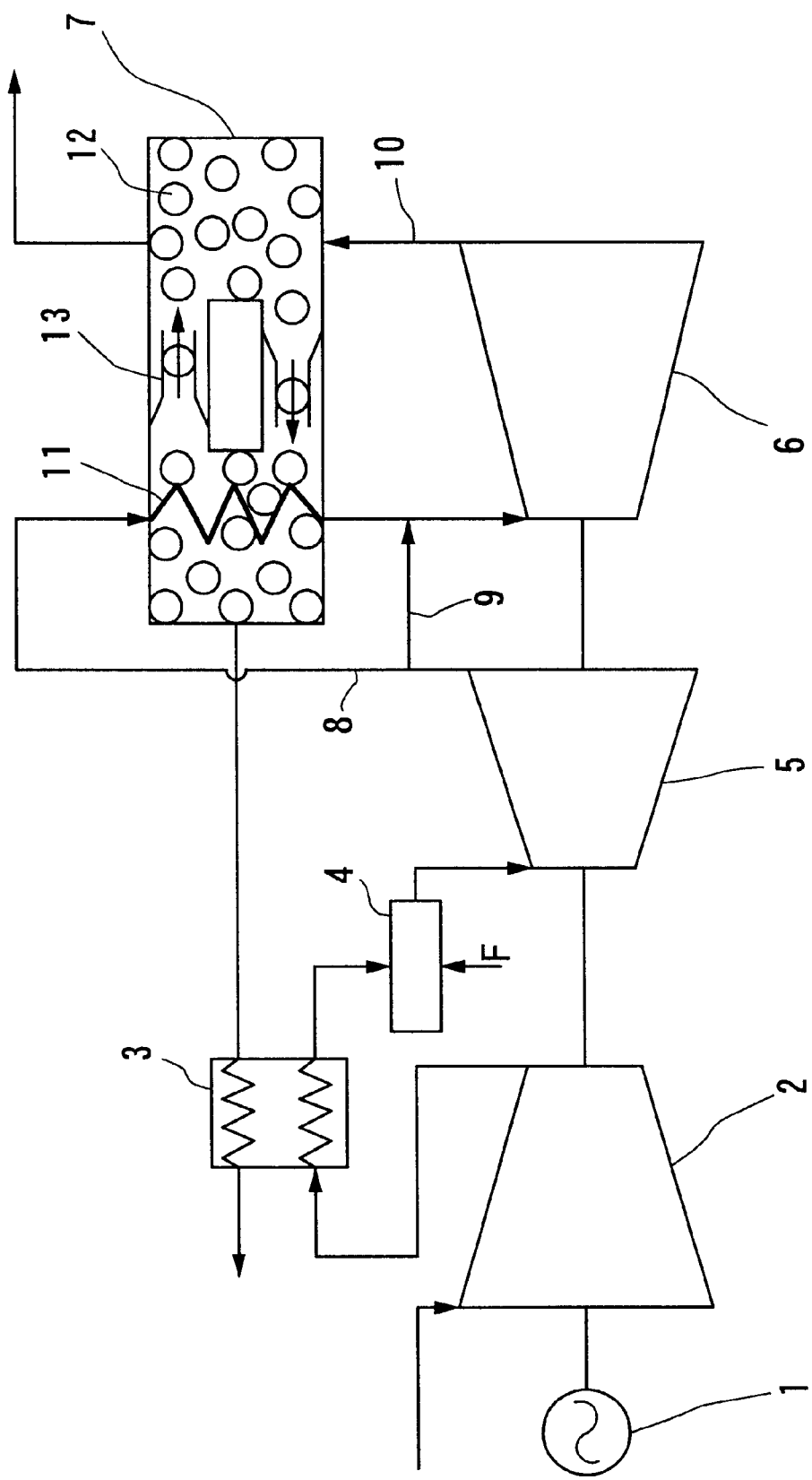
FIG. 1 is a system diagram schematically showing a thermal power plant according to a first embodiment of the present invention.

FIG. 1 is a system diagram schematically showing a thermal power plant according to a first embodiment of the present invention and shows one example of a gas turbine plant (simple cycle gas turbine).

According to this first embodiment, a gas turbine plant includes a generator 1, an air compressor 2, a regenerator 3, a gas turbine combustor 4, a high pressure gas turbine 5, a low pressure gas turbine 6 and a carbon dioxide absorbing and discharging equipment 7.

The air compressor 2 compresses an sucked air (atmosphere) to create or generate a high pressure air (highly pressurized air, and then, supplies the high pressure air to the gas turbine combustor 4 together with a fuel F. The gas turbine combustor 4 burns the fuel F with the use of the high pressure air as an oxidizing agent so as to generate a combustion gas, and then, supplies the generated combustion gas to the high pressure turbine 5. In the high pressure turbine 5, the combustion gas is expanded and works as a driving fluid, and then, drives the generator 1 and the air compressor 2 by making use of a driving torque generated at that moment. The high pressure turbine 5 increases a temperature of the high temperature turbine exhaust gas performing the work of expansion to 700° C., and then, supplies a part of the high temperature gas turbine exhaust gas to the carbon dioxide absorbing and discharging equipment 7 via a high temperature turbine exhaust gas supply pipe 8 while supplying the remainders thereof to the low pressure turbine 6 via a bypass pipe 9. The low pressure turbine 6 makes the high temperature gas turbine exhaust gas supplied from the high pressure turbine 5 perform a work of expansion, and then, drives the generator 1 and the air compressor 2 by making use of a driving torque generated at that moment, in the same manner as described above. Further, the low pressure turbine 6 increases a temperature of the low temperature turbine exhaust gas performing the work of expansion to about 500° C., and then, supplies the low temperature gas turbine exhaust gas to the carbon dioxide absorbing and discharging equipment 7 via a low temperature turbine exhaust gas supply pipe 10.

The carbon dioxide absorbing and discharging equipment 7 is provided with a heat exchanger 11, which is connected to the high temperature turbine exhaust gas supply pipe 8, in the cylindrical equipment 7. Further, the carbon dioxide absorbing and discharging equipment 7 is provided with a seal portion (sealing section) 13 at an intermediate portion of the equipment 7 while being filled up with a carbon dioxide absorbing and discharging agent 12 composed of a lithium substance as a main component. The carbon dioxide absorbing and discharging agent 12 using lithium as a main component has a property of absorbing carbon dioxide at a temperature of about 500° C. in the case where a concentration of carbon oxide is about 5% and decomposing an absorbed lithium carbonate at a temperature of about 700° C. In this case, in the carbon dioxide absorbing and discharging agent 12 using lithium, the above temperature varies depending upon a pressure, and for this reason, proper values of pressure and temperature need to be selected.

Next, an operation of the present invention will be described hereunder.

In the carbon dioxide absorbing and discharging equipment 7 of this first embodiment, carbon dioxide contained in a low temperature gas turbine exhaust gas supplied from the low pressure gas turbine 6 is absorbed in the carbon dioxide absorbing and discharging agent, and then, the absorbed lithium carbonate is decomposed by a high temperature gas turbine exhaust gas from the high pressure gas turbine 5.

First, in the carbon dioxide absorbing and discharging equipment 7, a low temperature gas turbine exhaust gas having a temperature of about 500° C. supplied from the low pressure gas turbine 6 via the low temperature turbine exhaust gas supply pipe 10 is directly contacted to the carbon dioxide absorbing and discharging agent 12. At this time, the carbon dioxide contained in the low temperature gas turbine exhaust gas reacts with the lithium substance of the carbon dioxide absorbing and discharging agent 12 to be absorbed in the agent, and then, the low temperature gas turbine exhaust gas, after the carbon dioxide is absorbed, is supplied to other equipment or the like.

Next, in the carbon dioxide absorbing and discharging equipment 7, the carbon dioxide absorbing and discharging agent 12 absorbing the carbon dioxide is moved towards a direction shown by an arrow via the seal portion 13, and then, indirectly carries out a heat exchange operation with a high temperature gas turbine exhaust gas having a temperature of about 700° C. supplied from the high pressure gas turbine 5 via the high temperature turbine exhaust gas supply pipe 8 by means of the heat exchanger 11, whereby the carbon dioxide absorbing and discharging agent 12 absorbing the carbon dioxide is heated. At this time, the lithium carbonate absorbing the carbon dioxide is decomposed so as to make low a concentration of the carbon dioxide, and the gas turbine exhaust gas is then supplied to the regenerator 3.

The regenerator 3 uses a gas turbine exhaust gas discharged from the carbon dioxide absorbing and discharging equipment 7 and having a low carbon dioxide concentration as a heat source. Further, the regenerator 3 heats a high pressure air supplied from the air compressor 2, and thereafter, supplies other exhaust gas to other equipment.

As described above, according to the first embodiment, the gas turbine plant is provided with the carbon dioxide absorbing and discharging equipment 7 which is filled up with a carbon dioxide absorbing and discharging agent 12 composed of a lithium substance as a main component. Further, the low temperature gas turbine exhaust gas having a temperature of about 500° C. supplied from the low pressure gas turbine 6 of the gas turbine plant is directly contacted to the carbon dioxide absorbing and discharging agent 12, and at this time, the carbon dioxide contained in the low temperature gas turbine exhaust gas reacts with the lithium substance of the carbon dioxide absorbing and discharging agent 12 so as to be absorbed in the agent. Then, the carbon dioxide absorbing and discharging agent 12 absorbing the carbon dioxide indirectly carries out a heat exchange operation with a high temperature gas turbine exhaust gas having a temperature of about 700° C. supplied from the high pressure gas turbine 5 of the gas turbine plant, and thus, the carbon dioxide absorbing and discharging agent 12 decomposes the lithium carbonate absorbing the carbon dioxide so as to make low a concentration of the carbon diode, thus contributing to a prevention for global worming effming effect and environmental pollution.

Furthermore, according to the first embodiment, the gas turbine plant is provided with the regenerator 3 which uses a gas turbine exhaust gas discharged from the carbon dioxide absorbing and discharging equipment 7 as a heat source and heats a high pressure air supplied from the air compressor 2 to the gas turbine combustor 4. Therefore, it is possible to effectively use a heat and to improve a plant heat (thermal) efficiency.

Figure 2:
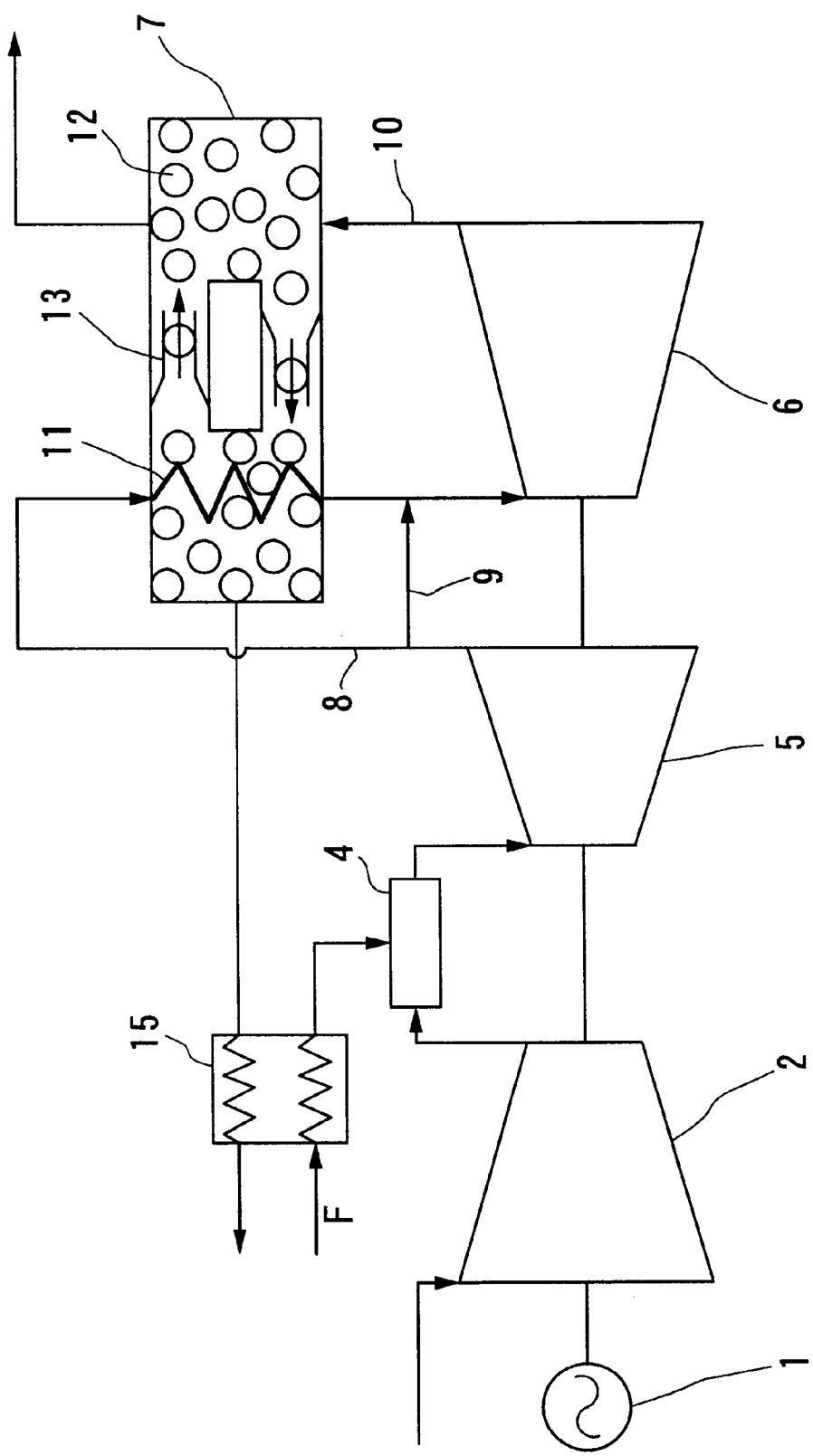
FIG. 2 is a system diagram schematically showing a thermal power plant according to a second embodiment of the present invention.

FIG. 2 is a system diagram schematically showing a thermal power plant according to a second embodiment of the present invention. Like reference numerals are used to designate the same components as those of the first embodiment, and the overlapping explanation is omitted.

The thermal power plant of this second embodiment is provided with a fuel heater 15 which uses a gas turbine exhaust gas discharged from the carbon dioxide absorbing and discharging equipment 7 and heats a fuel F supplied from a fuel supply system 14 to the gas turbine combustor 4.

In general, the following matter has been known in the gas turbine combustor 4. That is, when the introduced fuel F is previously heated, an internal energy of the combustor 4 becomes high, and a combustion gas of a high heating value is generated by a relatively small amount of fuel F.

In the second embodiment, the fuel supply system 14 is provided with the fuel heater 15, and then, a fuel F is heated with the use of a gas turbine exhaust gas discharged from the carbon dioxide absorbing and discharging equipment 7.

Therefore, in this second embodiment, the fuel supply system 14 is provided with the fuel heater 15, and then, a fuel F is previously heated, and thereafter, is introduced to the gas turbine combustor 4. Thus, it is possible to generate a combustion gas having a high heating value by a relatively small amount of fuel F and to improve a plant heat efficiency.

Figure 3:
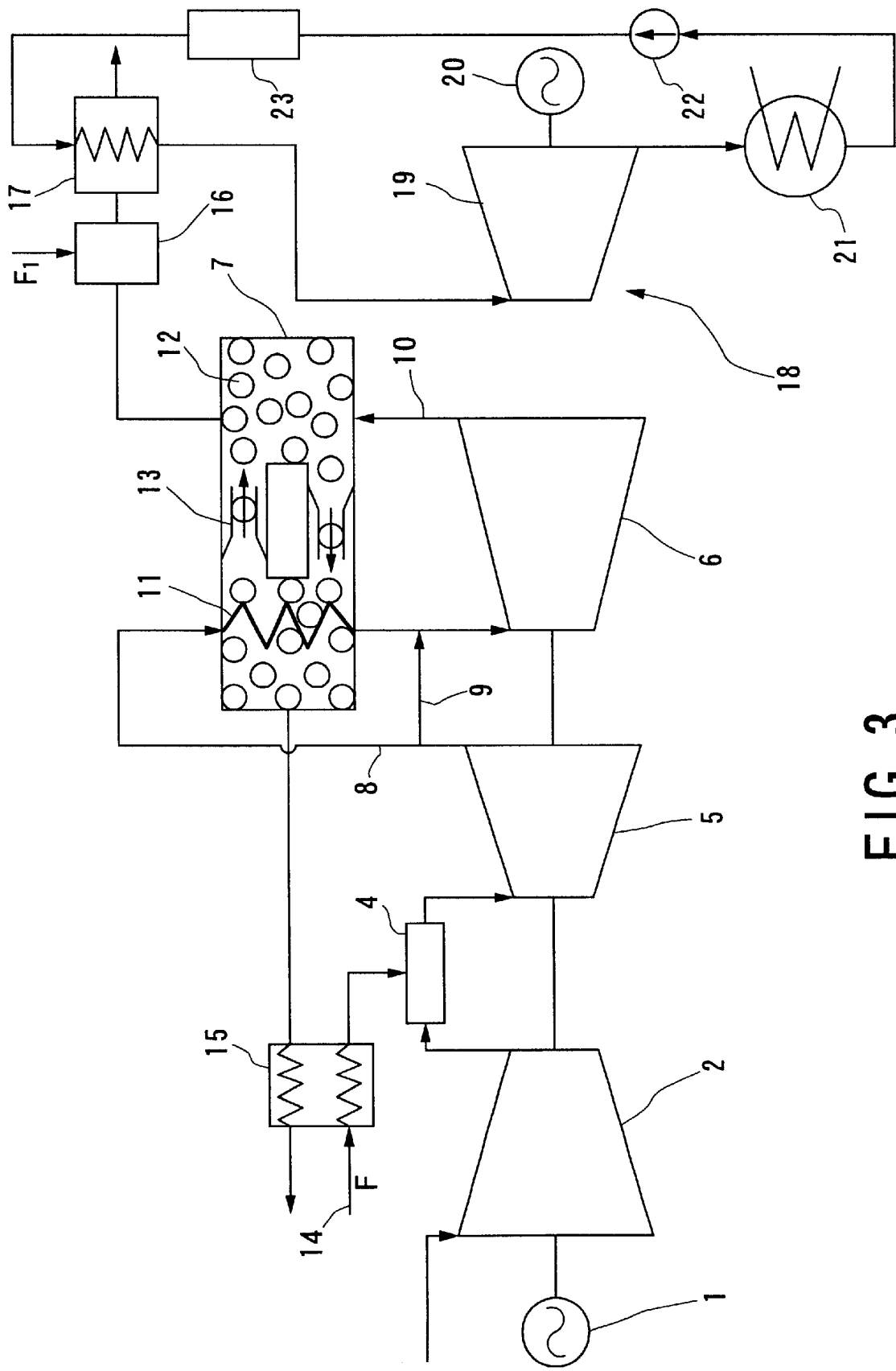
FIG. 3 is a system diagram schematically showing a thermal power plant according to a third embodiment of the present invention.

FIG. 3 is a system diagram schematically showing a thermal power plant according to a third embodiment of the present invention and shows one example of a combined cycle power generation plant combining the above turbine plant and an exhaust gas heat recovery boiler into the gas turbine. Like reference numerals are used to designate the same components as those of the first and second embodiments, and the overlapping explanation is omitted.

The thermal power plant of this third embodiment includes an exhaust gas heater 16, an exhaust gas heat recovery boiler 17, and a steam turbine plant 18. The exhaust gas heater 16, which again heats an gas turbine exhaust gas whose temperature becomes low, is located on a side of the low temperature gas turbine exhaust gas supply pipe 10 for supplying a low temperature gas turbine exhaust gas having a temperature of about 500° C. from the low pressure gas turbine 6 to the carbon dioxide absorbing and discharging equipment 7. The exhaust gas heat recovery boiler 17 introduces a fuel F1 into the exhaust gas heater 16 so as to generate a combustion gas and uses the combustion gas as a heat source so as to generate a steam. The steam turbine plant 18 uses the steam generated by the exhaust gas heat recovery boiler 17 as a driving source.

The steam turbine plant is constructed into a circulating closed circuit including a steam turbine 19, a generator 20, a condenser 21, a feed water pump 22 and a feed water heater 23. A steam supplied from the exhaust gas heat recovery boiler 17 performs a work of expansion in the steam turbine 19 so as to drive the generator 20, and then, the steam turbine exhaust gas performing the work of expansion is condensed by means of the condenser 21. Hence, the feed water thus condensed is again circulated into the exhaust gas heat recovery boiler 17 via the feed water pump 22 and the feed water heater 23.

In general, the following matter has been known in the combined cycle power generation plant which effectively uses an exhaust gas discharged from the gas turbine plant. More specifically, a plant heat efficiency becomes higher as compared with the case of using the gas turbine plant and the steam turbine plant as a single plant.

In this third embodiment, the gas turbine plant is provided with the carbon dioxide absorbing and discharging equipment 7 so as to make low a concentration of the carbon dioxide contained in the gas turbine exhaust gas discharged from the gas turbine plant. Further, the gas turbine plant is combined with the exhaust gas heat recovery boiler 17 and the steam turbine 18 so as to improve a plant heat efficiency.

Furthermore, in this third embodiment, like the second embodiment, the fuel supply system 14 for supplying the fuel F to the gas turbine combustor 4 is provided with the fuel heater 15, and then, the fuel F is heated with the use of an exhaust gas from the carbon dioxide absorbing and discharging equipment 7 as a heat source.

According to this third embodiment, the carbon dioxide absorbing and discharging equipment 7 is located on the low pressure gas turbine side, and the exhaust gas heat recovery boiler 17 and the steam turbine 18 are combined into the gas turbine plant, and further, the fuel supply system 14 is provided with the fuel heater 15. Therefore, it is possible to make low a concentration of carbon dioxide contained in the gas turbine exhaust gas and to improve a plant heat efficiency.

Figure 4:
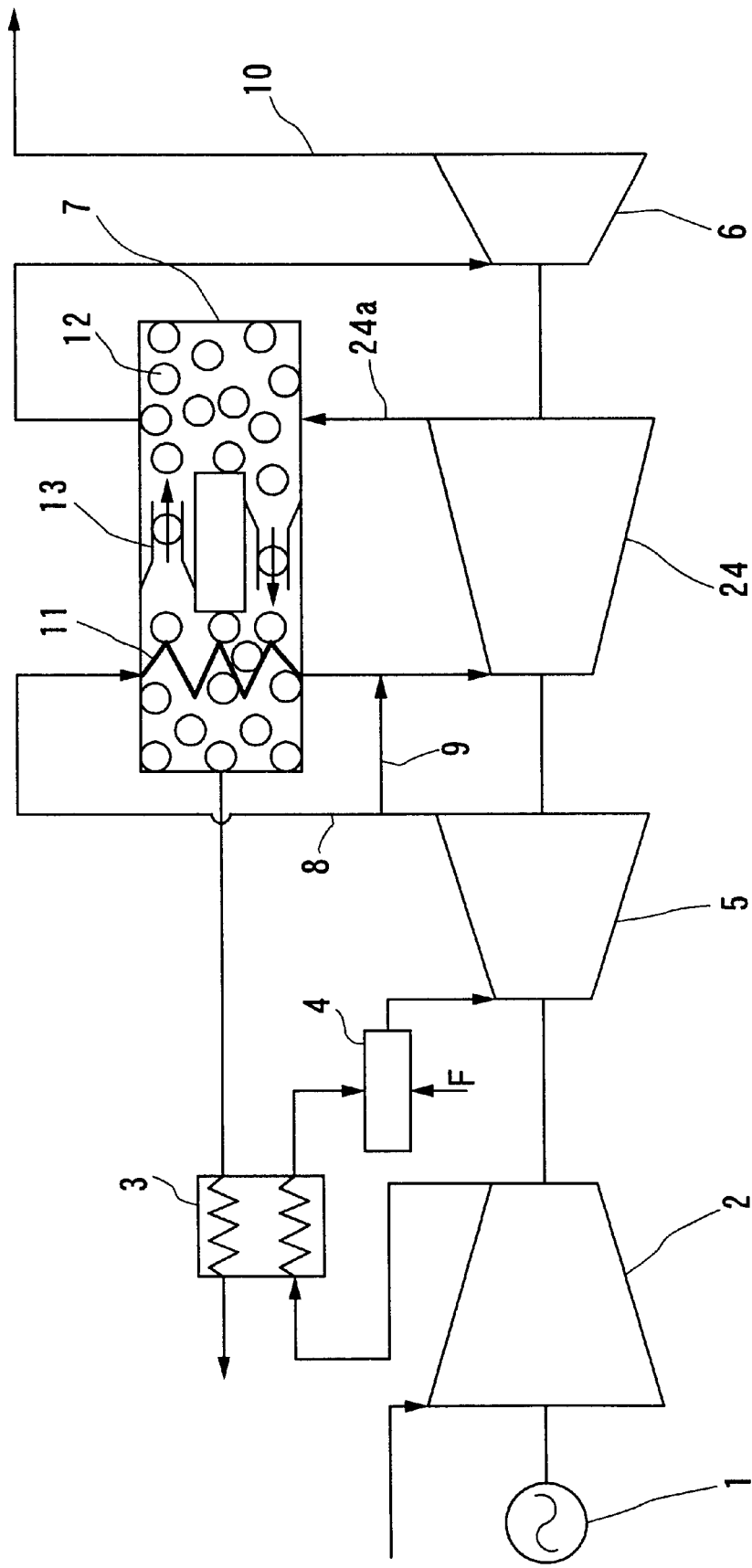
FIG. 4 is a system diagram schematically showing a thermal power plant according to a fourth embodiment of the present invention.

FIG. 4 is a system diagram schematically showing a thermal power plant according to a fourth embodiment of the present invention. Like reference numerals are used to designate the same components as those of the first embodiment, and the overlapping explanation is omitted.

The thermal power plant of this fourth embodiment is constructed in a manner of dividing a gas turbine plant into three gas turbine sections, that is, a high pressure gas turbine 5, an intermediate pressure gas turbine 24 and a low pressure gas turbine 6. An intermediate pressure gas turbine exhaust gas performs a work of expansion in the intermediate pressure gas turbine 24 so as to have a temperature of about 500° C. and a pressure of about 2 ata, and then, is supplied to the carbon dioxide absorbing and discharging equipment 7 via an intermediate pressure exhaust gas supply pipe 24a. The carbon dioxide contained in the intermediate pressure gas turbine exhaust gas reacts with the carbon dioxide absorbing and discharging agent 12 so as to be absorbed in the agent, and then, the remainders of the absorbed and reacted intermediate pressure exhaust gas is supplied to the low pressure gas turbine 6 via intermediate pressure exhaust gas supply pipe 24a so as to perform a work of expansion.

In general, the carbon dioxide absorbing and discharging agent 12 composed of a lithium substance as a main component is a heating medium having a temperature of about 500° C. and a pressure of about 2 ata. When heating the carbon dioxide absorbing and discharging agent 12, it has been confirmed according to the experiment that the agent effectively reacts to absorb the carbon dioxide.

In this fourth embodiment, such data is effectively used and the gas turbine plant is divided into three gas turbine sections, that is, the high pressure gas turbine 5, the intermediate pressure gas turbine 24 and the low pressure gas turbine 6. Further, the intermediate pressure gas turbine exhaust gas is set so as to have a temperature of about 500° C. and a pressure of about 2 ata in the intermediate pressure gas turbine 24, and thereafter, the intermediate pressure gas turbine exhaust gas is supplied to the carbon dioxide absorbing and discharging equipment 7.

In this fourth embodiment, the intermediate pressure gas turbine exhaust gas has a temperature and pressure suitable for the carbon dioxide absorbing and discharging agent 12 which reacts to absorb the carbon dioxide and is supplied from the intermediate pressure gas turbine 24. Thus, the carbon dioxide absorbing and discharging agent 12 reacts to absorb a large volume of carbon dioxide so as to make low a concentration of carbon dioxide, and it is possible to discharge the carbon dioxide to other equipment 7 via the regenerator 3, thus contributing to a prevention for global warming effect and environmental pollution.

Figure 5:
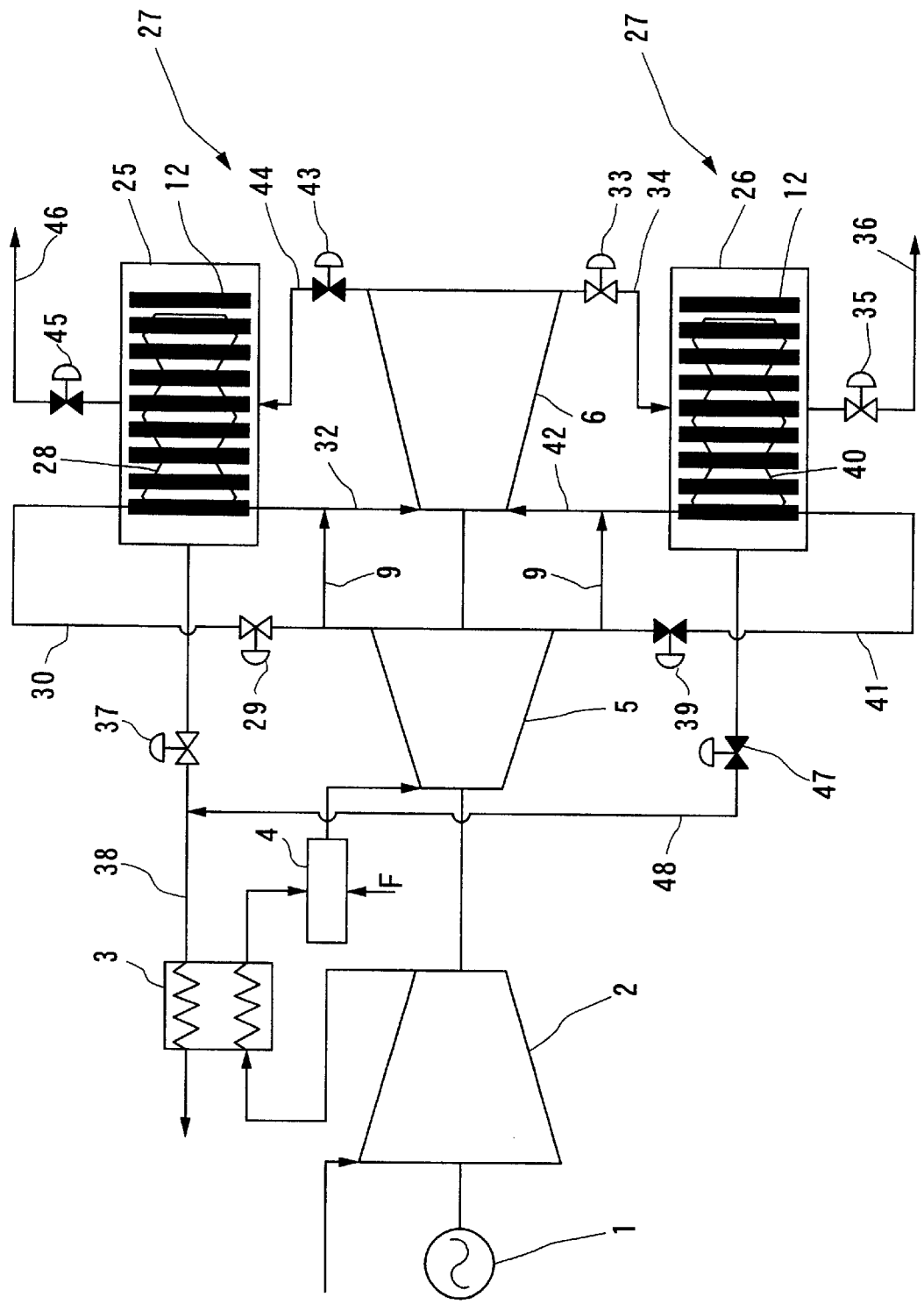
FIG. 5 is a system diagram schematically showing a thermal power plant according to a fifth embodiment of the present invention.

FIG. 5 is a system diagram schematically showing a thermal power plant according to a fifth embodiment of the present invention. Like reference numerals are used to designate the same components as those of the first embodiment, and the overlapping explanation is omitted.

The thermal power plant of this fifth embodiment is provided with a first carbon dioxide absorbing and discharging equipment 25, a second carbon dioxide absorbing and discharging equipment 26 and a change-over system 27 in place of keeping the carbon dioxide absorbing and discharging agent 12 in a static state. These first and second carbon dioxide absorbing and discharging equipments 25 and 26 are located on an outlet side of the high pressure turbine 5. The change-over system 27 freely changes over these first and second carbon dioxide absorbing and discharging equipments 25 and 26, and then, the carbon dioxide contained in a low temperature gas turbine exhaust gas supplied from the low pressure gas turbine 6 can react to be absorbed in any of the carbon dioxide absorbing and discharging agents 12, 12 of the carbon dioxide absorbing and discharging equipments 25 and 26.

The change-over system 27 includes a first high temperature turbine exhaust gas supply pipe 30, a second low temperature turbine exhaust gas supply pipe 34, a second discharge system 36, and a first heated exhaust gas supply system 38. The first high temperature turbine exhaust gas supply pipe 30 supplies a high temperature gas turbine exhaust gas having a temperature of about 700° C. to a first heat exchanger 28 of the first carbon dioxide absorbing and discharging equipment 25 from the high pressure gas turbine 5 via a valve 29. The second low temperature turbine exhaust gas supply pipe 34 uses the high temperature gas turbine exhaust gas supplied from the first high temperature turbine exhaust gas supply pipe 30 to the first heat exchanger 28 as a heat source, and then, supplies the high temperature gas turbine exhaust gas after heating the carbon dioxide absorbing and discharging agent 12 of the carbon dioxide absorbing and discharging equipment 25 to the low pressure gas turbine 6 via a first supply pipe 32 for the pressure gas turbine.

The second low temperature turbine exhaust gas supply pipe 34 controls the low temperature gas turbine exhaust gas performing the work of expansion to a temperature of about 500° C., and then, supplies the low temperature gas turbine exhaust gas to the carbon dioxide absorbing and discharging agent 12 of the carbon dioxide absorbing and discharging equipment 26 via a valve 33 so that the carbon dioxide can be absorbed.

The second discharge system 36 supplies the gas turbine exhaust gas, whose carbon dioxide reacts to be absorbed in the carbon dioxide absorbing and discharging agents 12, to the other equipment via a valve 35. The first heated exhaust gas supply system 38 supplies the gas turbine exhaust gas having a low concentration of carbon dioxide to the regenerator 3 via a valve 37 when decomposing the lithium carbonate absorbed in the carbon dioxide absorbing and discharging agent 12 of the carbon dioxide absorbing and discharging equipment 25. The first heated exhaust gas supply system 38 then heats a high pressure air from the air compressor 2 to the gas turbine combustor 4.

Moreover, the change-over system 27 includes a second high temperature turbine exhaust gas supply pipe 41, a first low temperature turbine exhaust gas supply pipe 44, first discharge system 46, and a second heated exhaust gas supply system 48. The second high temperature turbine exhaust gas supply pipe 41 supplies a high temperature gas turbine exhaust gas having a temperature of about 700° C. to a second heat exchanger 40 of the second carbon dioxide absorbing and discharging equipment 26 from the high pressure gas turbine 5 via a valve 39.

The first low temperature turbine exhaust gas supply pipe 44 uses the high temperature gas turbine exhaust gas supplied from the second high temperature turbine exhaust gas supply pipe 41 to the second heat exchanger 40 as a heat source, and then, supplies the high temperature gas turbine exhaust gas after heating the carbon dioxide absorbing and discharging agent 12 of the carbon dioxide absorbing and discharging equipment 26 to the low pressure gas turbine 6 via a second supply pipe 42 for low pressure gas turbine.

Further, the first low temperature turbine exhaust gas supply pipe 44 controls the low temperature gas turbine exhaust gas performing the work of expansion to a temperature of about 500° C., and then, supplies the low temperature gas turbine exhaust gas to the carbon dioxide absorbing and discharging agent 12 of the first carbon dioxide absorbing and discharging equipment 25 via a valve 43 so that the carbon dioxide can be absorbed. The first discharge system 46 supplies the gas turbine exhaust gas, whose carbon dioxide reacts to be absorbed in the carbon dioxide absorbing and discharging agents 12, to the other equipment via a valve 45. The second heated exhaust gas supply system 48 supplies the gas turbine exhaust gas having a low concentration of carbon dioxide to the regenerator 3 via a valve 47 when decomposing the lithium carbonate absorbed in the carbon dioxide absorbing and discharging agent 12 of the second carbon dioxide absorbing and discharging equipment 26, and then, heats a high pressure air from the air compressor 2 to the gas turbine combustor 4. In FIG. 5, valves 39, 43, 45 and 47 (blackened) show a closed state and valves 29, 33 and 37 (white) show an opened state.

In the change-over system 27 having the structure mentioned above, the high temperature gas turbine exhaust gas having a temperature of about 700° C. is supplied from the high pressure gas turbine 5 to the first heat exchanger 28 of the first carbon dioxide absorbing and discharging equipment 25 via the valve 29 and the first high temperature turbine exhaust gas supply pipe 30. Then, the first carbon dioxide absorbing and discharging agent 12 is heated so that the lithium carbonate absorbed in the carbon dioxide absorbing and discharging agent 12 is decomposed, and the gas turbine exhaust gas having a low concentration of carbon dioxide is supplied to the regenerator 3 via the valve 37 so that a high pressure air from the air compressor 2 is heated.

On the other hand, the high temperature gas turbine exhaust gas discharged from the first heat exchanger 28 of the first carbon dioxide absorbing and discharging equipment 25 is supplied to the low pressure gas turbine 6 via the first supply pipe 32 for low pressure gas turbine, and then, carries out a work of expansion therein. Then, the low temperature gas turbine exhaust gas having a temperature of about 500° C. is supplied to the carbon dioxide absorbing and discharging agent 12 of the second carbon dioxide absorbing and discharging equipment 26 via the valve 33 and the second low temperature turbine exhaust gas supply pipe 34 so as to absorb the carbon dioxide. Thereafter, the low temperature gas turbine exhaust gas is supplied to the other equipment via the valve 35 and the second discharge system 36. In the change-over system 27, in the case of supplying the high temperature gas turbine exhaust gas having a temperature of about 700° C. from the high pressure gas turbine 5 to the second heat exchanger 40 of the second carbon dioxide absorbing and discharging equipment 26, the valves 39, 43, 45 and 47 are opened so as to flow the exhaust gas.

As described above, in this fifth embodiment, the first and second carbon dioxide absorbing and discharging equipments 25 and 26 are located on the gas turbine exhaust gas side of the high pressure gas turbine 5, and then, these carbon dioxide absorbing and discharging equipment can be used so as to be freely changed over. Thus, it is possible to continuously treat, much in amount, the carbon dioxide contained in the low temperature gas turbine exhaust gas, and, as a result, it is possible to contribute to a prevention for global warming effect and environmental pollution.

It is to be noted that the present invention is not limited to the described embodiments and many other changes and modifications may be made without departing from the scopes of the appended claims.

What is claimed is:

1. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

a low pressure gas turbine operatively connected to the high pressure gas turbine and adapted to perform an expansion working of the exhaust gas from the high pressure gas turbine and generate an exhaust gas containing carbon dioxide; and a carbon dioxide absorbing and discharging equipment located on an outlet side of the low pressure gas turbine, said carbon dioxide absorbing and discharging equipment being provided with a carbon dioxide absorbing and discharging agent having a property of absorbing the carbon dioxide contained in the exhaust gas supplied from the low pressure gas turbine in a manner which forms a carbonate, said carbon dioxide absorbing and discharging equipment being arranged to decompose the carbonate using the exhaust gas supplied from the high pressure gas turbine, wherein a temperature of the gas turbine exhaust gas supplied from the high pressure gas turbine to the carbon dioxide absorbing and discharging equipment and a temperature of the exhaust gas supplied from the low pressure gas turbine to the carbon dioxide absorbing and discharging equipment are set to pre-determined ranges of values different from each other, and wherein the carbon dioxide in the gas turbine exhaust gas supplied from the low pressure gas turbine is absorbed by the carbon dioxide absorbing agent and discharging equipment and wherein the gas turbine exhaust as supplied from the high pressure gas turbine decomposes the carbonate in the carbon dioxide absorbing and discharging equipment.

2. A thermal power plant according to claim 1, further comprising another carbon dioxide absorbing and discharging equipment located on an outlet side of the low pressure gas turbine; and a change-over system operatively connected to the carbon dioxide absorbing and discharging equipments and adapted to selectively change connection between the outlet side of the low pressure gas turbine and one of the carbon dioxide absorbing and discharging equipments to the other of the carbon dioxide absorbing and discharging equipments.

3. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

a low pressure gas turbine operatively connected to the high pressure gas turbine and adapted to perform an expansion working of the exhaust gas from the high pressure gas turbine and generate an exhaust gas containing carbon dioxide;

a carbon dioxide absorbing and discharging equipment located on an outlet side of the low pressure gas turbine, said carbon dioxide absorbing and discharging equipment being provided with a carbon dioxide absorbing and discharging agent having a property of absorbing the carbon dioxide contained in the exhaust gas supplied from the low pressure gas turbine in a manner which forms a carbonate, said carbon dioxide absorbing and discharging equipment being arranged to decompose the carbonate using the exhaust gas supplied from the high pressure gas turbine, wherein a temperature of the gas turbine exhaust gas supplied from the high pressure gas turbine to the carbon dioxide absorbing and discharging equipment and a temperature of the exhaust gas supplied from the low pressure gas turbine to the carbon dioxide absorbing and discharging equipment are set to pre-determined ranges of values different from each other; and a regenerator operatively connected to the carbon dioxide absorbing and discharging equipment and the air compressor and adapted to generate heat by utilizing carbon dioxide gas discharged from the carbon dioxide absorbing and discharging equipment as a heat source and to heat the high pressure air supplied from the air compressor to the gas turbine combustor.

4. A thermal power plant according to claim 3, further comprising another carbon dioxide absorbing and discharging equipment located on an outlet side of the low pressure gas turbine; and a change-over system operatively connected to the carbon dioxide absorbing and discharging equipments and adapted to selectively change connection between the outlet side of the low pressure gas turbine and one of the carbon dioxide absorbing and discharging equipments to the other of the carbon dioxide absorbing and discharging equipments.

5. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

an intermediate pressure gas turbine operatively connected to the high pressure gas turbine and adapted to perform an expansion working of the exhaust gas from the high pressure gas turbine and generate an exhaust gas; and a carbon dioxide absorbing and discharging equipment located on an outlet side of the intermediate pressure gas turbine, said carbon dioxide absorbing and discharging equipment being provided with a carbon dioxide absorbing and discharging agent,
wherein a temperature of the gas turbine exhaust gas supplied from the high pressure gas turbine to the carbon dioxide absorbing and discharging equipment and a temperature of the exhaust gas supplied from the intermediate pressure gas turbine to the carbon dioxide absorbing and discharging equipment are set to a predetermined range of values different from each other, a low pressure gas turbine operatively connected to the carbon absorbing and discharging equipment and adapted to perform an expansion working of the exhaust gas from the intermediate pressure turbine, and the gas turbine exhaust gas supplied from the intermediate pressure gas turbine is absorbed by the carbon dioxide absorbing and discharging equipment and the gas turbine exhaust gas supplied from the high pressure gas turbine decomposes the absorbed carbonate in the carbon dioxide absorbing and discharging equipment.

6. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

an intermediate pressure gas turbine operatively connected to the high pressure gas turbine and adapted to perform an expansion working of the exhaust gas from the high pressure gas turbine and generate an exhaust gas;

a carbon dioxide absorbing and discharging equipment located on an outlet side of the intermediate pressure gas turbine, said carbon dioxide absorbing and discharging equipment including a carbon dioxide absorbing and discharging agent composed of a lithium substance which absorbs carbon dioxide contained in the exhaust gas supplied from the intermediate pressure gas turbine and which is decomposed from its lithium carbonate form by the exhaust gas supplied from the high pressure gas turbine;

a low pressure gas turbine operatively connected to the carbon absorbing and discharging equipment and adapted to perform an expansion working of the exhaust gas from the intermediate pressure turbine; and a regenerator operatively connected to the carbon dioxide absorbing and discharging equipment and the air compressor and adapted to generate a heat by utilizing a carbon dioxide gas discharged from the carbon dioxide absorbing and discharging equipment as a heat source and to heat the high pressure air supplied from the air compressor to the gas turbine combustor.

7. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

a low pressure gas turbine operatively connected to the high pressure gas turbine and adapted to perform an expansion working of the exhaust gas from the high pressure gas turbine and generate an exhaust gas containing carbon dioxide; and a carbon dioxide absorbing and discharging equipment located on an outlet side of the low pressure gas turbine, said carbon dioxide absorbing and discharging equipment being provided with a carbon dioxide absorbing and discharging agent having a property of absorbing the carbon dioxide contained in the exhaust gas supplied from the low pressure gas turbine and decomposing the absorbed carbonate by the exhaust gas supplied from the high pressure gas turbine, wherein a temperature of the gas turbine exhaust gas supplied from the high pressure gas turbine to the carbon dioxide absorbing and discharging equipment and a temperature of the exhaust gas supplied from the low pressure gas turbine to the carbon dioxide absorbing and discharging equipment are set to predetermined ranges of values different from each other, and wherein the carbon dioxide absorbing and discharging equipment is provided with a heat exchanger for heating the carbon dioxide absorbing and discharging agent using the exhaust gas from the high pressure gas turbine.

8. A thermal power plant according to claim 7, further comprising a fuel heater operatively connected to the carbon dioxide absorbing and discharging equipment and the gas turbine combustor and adapted to heat the fuel to be supplied to the gas turbine combustor by using the carbon dioxide gas discharged from the carbon dioxide absorbing and discharging equipment as a heat source.

9. A thermal power plant according to claim 7, further comprising an exhaust gas heat recovery boiler operatively connected to the low pressure gas turbine exhaust gas side of the carbon dioxide absorbing and discharging equipment and adapted to generate a steam and a steam turbine plant which is driven by the steam generated from the exhaust gas heat recovery boiler.

10. A thermal power plant according to claim 9, further comprising a fuel heater operatively connected to the carbon dioxide absorbing and discharging equipment and the gas turbine combustor and adapted to heat the fuel to be supplied to the gas turbine combustor by using the carbon dioxide gas discharged from the carbon dioxide absorbing and discharging equipment as a heat source.

11. A thermal power plant according to claim 7, wherein the carbon dioxide absorbing and discharging equipment is provided with a seal portion for sealing and circulating the carbon dioxide absorbing and discharging agent therein.

12. A thermal power plant according to claim 7, wherein said carbon dioxide absorbing and discharging agent is composed of a lithium substance.

13. A thermal power plant according to claim 12, wherein a temperature of the gas turbine exhaust gas supplied from the high pressure gas turbine to the carbon dioxide absorbing and discharging equipment is set to approximately 700° C.

14. A thermal power plant according to claim 12, wherein a temperature of the exhaust gas supplied from the low pressure gas turbine to the carbon dioxide absorbing and discharging equipment is set to approximately 500° C.

15. A thermal power plant according to claim 7, further comprising a regenerator operatively connected to the carbon dioxide absorbing and discharging equipment and the air compressor and adapted to generate a heat by utilizing a carbon dioxide gas discharged from the carbon dioxide absorbing and discharging equipment as a heat source and to heat the high pressure air supplied from the air compressor to the gas turbine combustor.

16. A thermal power plant comprising:

an air compressor which compresses a sucked air to generate a high pressure air;

a gas turbine combustor operatively connected to the air compressor and adapted to supply a fuel to the high pressure air from the air compressor to generate a combustion gas;

a high pressure gas turbine operatively connected to the gas turbine combustor and adapted to perform an expansion working of the combustion gas from the gas turbine combustor and generate an exhaust gas;

an intermediate pressure gas turbine operatively connected to the high pressure gas turbine and adapted to perform an expansion working of the exhaust gas from the high pressure gas turbine and generate an exhaust gas;

a carbon dioxide absorbing and discharging equipment located on an outlet side of the intermediate pressure gas turbine, said carbon dioxide absorbing and discharging equipment being provided with a carbon dioxide absorbing and discharging agent composed of a substance which absorbs carbon dioxide contained in the exhaust gas supplied from the intermediate pressure gas turbine to form a carbonate and which is decomposed from its carbonate form by the exhaust gas supplied from the high pressure gas turbine; and a low pressure gas turbine operatively connected to the carbon dioxide absorbing and discharging equipment and adapted to perform an expansion working of the exhaust gas from the intermediate pressure gas turbine, and wherein the carbon dioxide absorbing and discharging equipment is provided with a heat exchanger for heating the carbon dioxide absorbing and discharging agent by using the exhaust gas from the high pressure gas turbine.

17. A thermal power plant according to claim 16, wherein the carbon dioxide absorbing and discharging equipment is provided with a seal portion for sealing and circulating the carbon dioxide absorbing and discharging agent therein.

18. A thermal power plant according to claim 16, wherein said carbon dioxide absorbing and discharging agent is composed of a lithium substance.

19. A thermal power plant according to claim 18, wherein the exhaust gas supplied from the intermediate pressure gas turbine to the carbon dioxide absorbing and discharging equipment is set so as to have a temperature of approximately 500° C. and a pressure of about 2 atmosphere.

20. A thermal power plant according to claim 16, further comprising a regenerator operatively connected to the carbon dioxide absorbing and discharging equipment and the air compressor and adapted to generate a heat by utilizing a carbon dioxide gas discharged from the carbon dioxide absorbing and discharging equipment as a heat source and to heat the high pressure air supplied from the air compressor to the gas turbine combustor.

* * * * *